Feb. 12, 1924. 1,483,664
J. A. KEMPEL
MACHINE FOR REMOVING THIN RUBBER ARTICLES FROM FORMS
Filed Dec. 29, 1921  3 Sheets-Sheet 2

John A. Kempel, Inventor
By F. E. Shannon
Attorney

Patented Feb. 12, 1924.

1,483,664

UNITED STATES PATENT OFFICE.

JOHN A. KEMPEL, OF COVENTRY TOWNSHIP, SUMMIT COUNTY, OHIO.

MACHINE FOR REMOVING THIN RUBBER ARTICLES FROM FORMS.

Application filed December 29, 1921. Serial No. 525,679.

*To all whom it may concern:*

Be it known that I, JOHN A. KEMPEL, a citizen of the United States, residing at Coventry Township, in the county of Summit and State of Ohio, have invented new and useful Improvements in Machines for Removing Thin Rubber Articles from Forms, of which the following is a specification.

This invention relates to new and useful improvements in machines for removing dipped rubber articles from the forms on which the same are manufactured.

In the manufacture of thin rubber articles such as gloves, rubber balloons, finger cots and the like, a suitable form is provided and the article is formed by immersing the form in a siccative solution of rubber, preferably rubber dissolved in naphtha or other suitable solvent. A coating of rubber is thus deposited on the form and a sufficient time is allowed for the rubber solution to congeal, whereupon it is again dipped in the solution and the process is repeated until a rubber body having the desired thickness has been formed. The rubber article is then subjected to a process of vulcanization and removed from the form. The removal of the article from the mold is ordinarily accomplished by hand labor, a process which is necessarily slow and tedious.

It is an object of this invention to provide a machine of simple, durable construction which will be exceedingly rapid and economical in operation and which will remove dipped rubber goods from the form on which the same are manufactured without injury thereto.

In carrying out the above described process of manufacture, a plurality of forms are arranged in parallel rows on a suitable support which for the purpose of this description will be termed a form board.

It is a particular object of this invention to provide a new and improved device which may be used in connection with said form board to strip the articles from the forms on which the same are manufactured without removing the forms from the board on which the same are secured.

The above and additional objects are accomplished by the novel construction, combination and arrangement of parts hereinafter fully described and illustrated in the accompanying drawings wherein I have shown a preferred embodiment of the invention, it being understood that the invention is capable of various adaptations and that changes and modifications may be made or substitutions resorted to which come within the scope of the appended claims.

In the drawings in which like characters of reference are employed to designate simple parts as the same may be disclosed in any of the several views and in which:—

Figure 1:
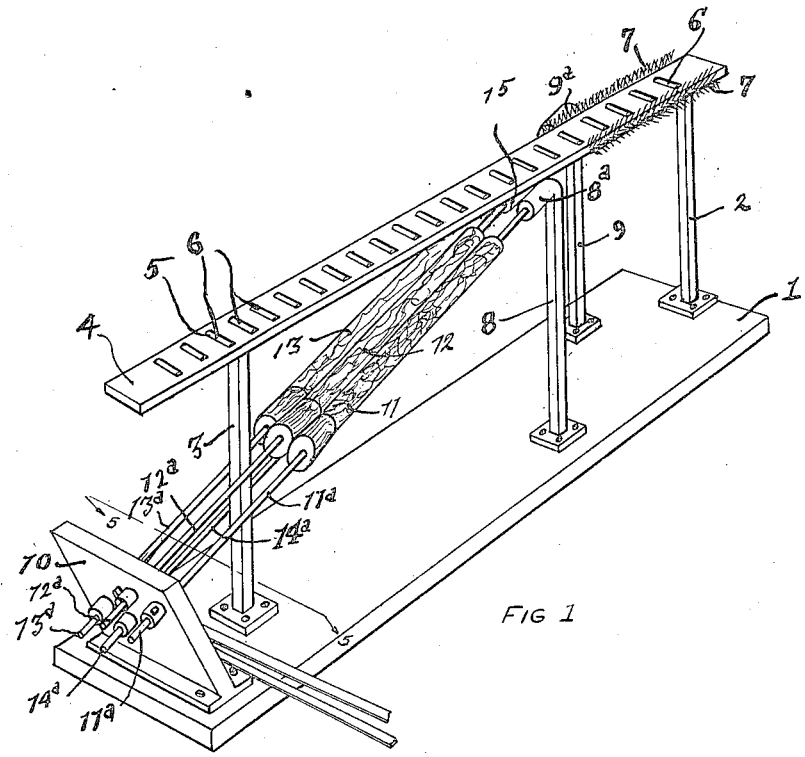
Figure 1 is a perspective view of a machine constructed in accordance with this invention.

In the drawings, the numeral 1 denotes a suitable base and the numerals 2 and 3 denote upright posts which are suitably secured to said base. The numeral 4 denotes a horizontal member which is supported by said posts so as to be positioned longitudinally of the base 1 in spaced, parallel relation thereto. The member 4 constitutes a slideway and is adapted to support a form board during the operation of the machine as hereinafter described. In order to reduce the friction offered by said slideway to said form board, the member 4 is provided with a longitudinally extending series of spaced parallel rollers 6 which are mounted in suitable slots 5 so as to be freely rotatable on a horizontal axis running transversely of the member 4 and with a portion of each roller 6 projecting above the upper face of the member 4. The slideway 4 is provided, at the work-receiving end thereof, with the elongated brushes 7, one of which is secured to each side of said member so as to project laterally therefrom for a purpose to be hereinafter described. The numeral 8 denotes an upright post which is secured to said base at a point adjacent one side thereof and intermediate its length. The post 8 terminates in approximately the same horizontal plane with the slideway 4 and is provided, at the upper end thereof, with a downwardly inclined portion $8^a$ which projects therefrom toward the delivery end of the machine. The portion $8^a$ is provided with a suitable bearing in which is mounted the upper end of the shaft $11^a$. The numeral 10 denotes a bracket which is suitably secured to the base 1 at the delivery end of the machine and serves as a support in which is mounted the lower ends of the shafts $11^a$, $12^a$, $13^a$, and $14^a$. The numeral 15 denotes a bracket which is secured to the lower face of the member 4 so as to project downwardly therefrom at a point in transverse alinement with the portion $8^a$ so as to provide a support for the upper end of the shaft $12^a$ which is rotatably secured therein. The lower end of the shaft $12^a$ is journaled in the bracket 12. The shafts $11^a$ and $12^a$ are parallel and are both disposed in an inclined plane which intersects the member 4 and the bracket 10. The shafts $11^a$ and $12^a$ are parallel and are mounted on opposite sides of a vertical plane extending in spaced parallel relation to the edge of the slideway 4. The numeral 9 denotes an upright post which is similar to the post 8 and is similarly secured to the base 1 at a point adjacent the opposite side thereof and nearer the receiving end of the machine. The post 9 is likewise provided with the downwardly inclined portion $9^a$ which projects from the upper end thereof toward the bracket 10 and provides a support for the upper end of the shaft $13^a$ which is rotatably secured therein.

The numeral 16 denotes a bracket which is secured to the under side of the member 4 at a point in transverse alinement with the portion $9^a$ of the post 9. The bracket 16 provides a support for the upper end of the roller 14 and is similar to the bracket 15, but is positioned nearer the receiving end of the machine. The shafts $13^a$ and $14^a$ are parallel and are both disposed in an inclined plane running in parallel, spaced relation to the plane extending through the shafts $11^a$ and $12^a$.

Each of said shafts is provided with a hollow roller which is rigidly fixed thereon. The numerals 11, 12, 13 and 14 are used to denote the rollers on the shafts $11^a$, $12^a$, $13^a$ and $14^a$ respectively. Each of said rollers is provided with a covering of relatively soft yielding material and I prefer to use for this purpose sheep skin from which the wool has not been removed. The sheep skin is cut in long strips which are wound helically around each roller in overlapped convolutions advancing toward the receiving end of the shaft. Obviously, the space between the rollers 11 and 12 and the space between the rollers 13 and 14 will depend upon the size and shape of the forms from which the rubber articles are to be removed.

In the adaptation of the invention illustrated, each roller is provided at the bottom thereof with a flared felt covering. This form of covering being particularly adapted to remove the articles manufactured on the forms illustrated in the drawings.

The numeral 20 denotes a spur wheel which is rigidly mounted on the shaft $14^a$ at a point adjacent the bracket 10 and the numeral 21 denotes a similar spur wheel which is meshed with the wheel 20 and is mounted on the shaft $13^a$. The numeral 22 denotes a like spur wheel which is in mesh with the wheel 20 and is similarly mounted on the shaft $12^a$ and the numeral 23 denotes a similar spur wheel which is in mesh with the wheel 22 and is mounted on the shaft $11^a$. The numeral 18 denotes a drive pulley which is fixed to the shaft 14 and the numeral 19 denotes a transmission belt adapted to be operatively connected to the drive wheel of a motor (not shown) or other source of power.

It will thus be seen that all of the said rollers will be rotated at the same rate of speed and that the adjacent surfaces of the rollers 11 and 12 and the adjacent surfaces of the rollers 13 and 14 will travel in a downward direction.

The forms 24 shown in the drawings are preferably made of glass or porcelain and are hollow and provided with an opening into which is submitted or otherwise secured a suitable plug 25. The plug 25 is provided with an enlarged cylindrical end which is provided with a peripheral groove 26. The plug is further provided with a bore 27 which extends coaxially therein from the outer end thereof. The numeral 28 denotes a form board which is provided with two rows of regularly spaced pins 29 which are disposed longitudinally thereof in parallel spaced relation. The forms 24 are positioned on the board 28 by placing the plugs over the pins 29 with the pins seated in the bores 27.

Figure 2:
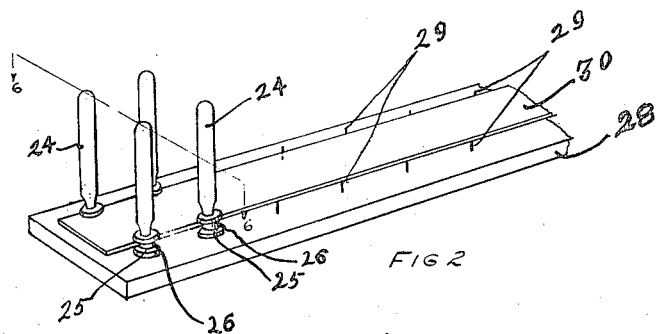
Figure 2 is a perspective view of one of the form boards employed in carrying out the invention and showing a plurality of balloon forms secured thereto.
Figure 3:
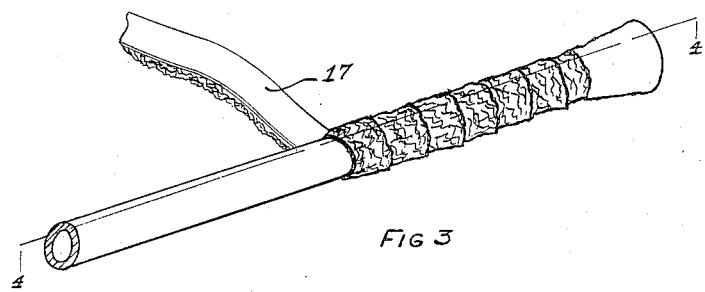
Figure 3 is a perspective view of a portion of one of the padded rolls employed in carrying out this invention.
Figure 4:
Figure 4 is a central, longitudinal, sectional view of same taken as indicated by the line 4—4 of Figure 3.
Figures 5, 6:
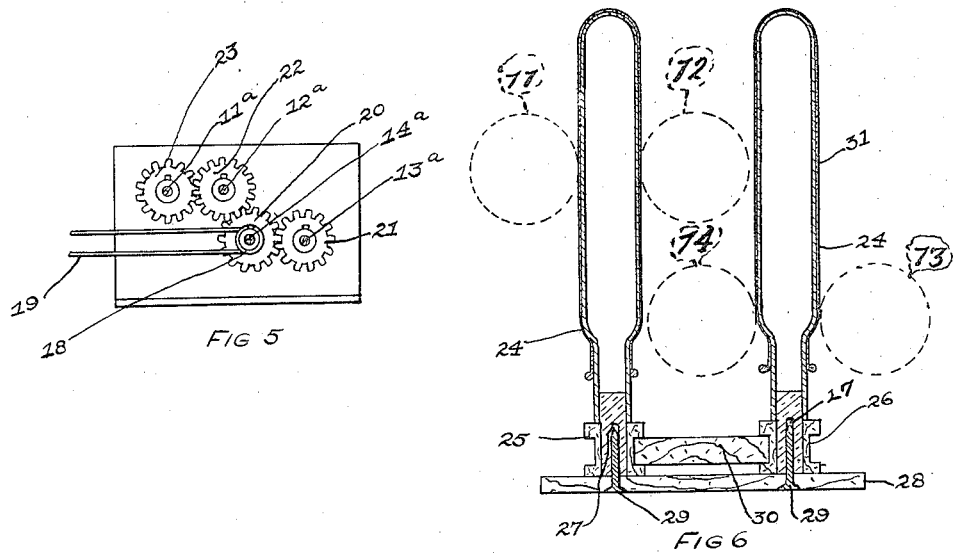
Figure 5 is a view showing in plan the arrangement of gears employed in driving said rolls.
Figure 6 is a cross sectional view taken approximately on line 6—6 of Figure 2.
Figure 7:
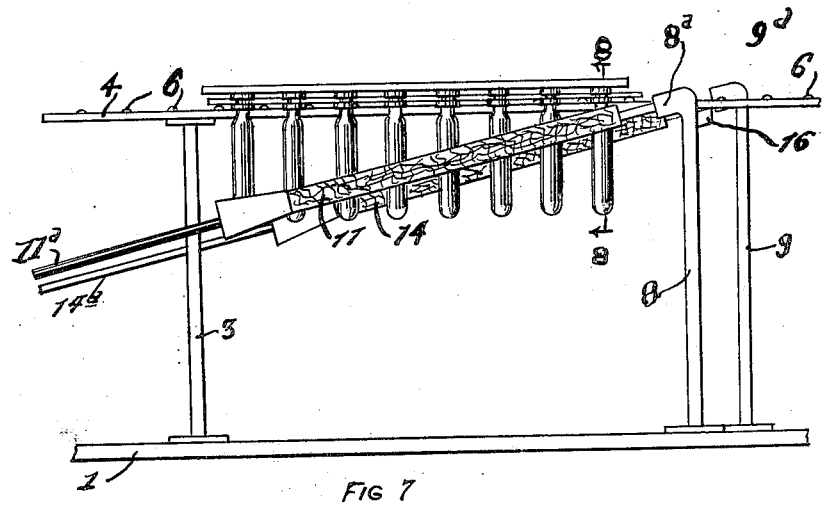
Figure 7 is a view in side elevation showing a portion of my improved device with a board containing a plurality of forms operatively positioned therein.
Figure 8:
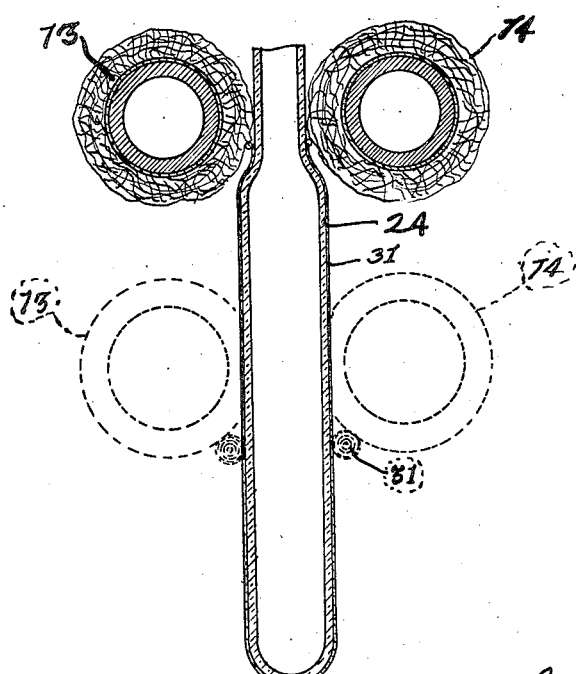
Figure 8 is a cross sectional view taken approximately on line 8—8 of Figure 7 and illustrating in cross section and by dotted lines the operation of my improved device.

The numeral 30 denotes a board which is slid between the two rows of forms with each edge thereof in the grooves 26 as clearly shown in Figures 2 and 6. The forms 24 are thus secured to the board 28 before the dipping process is begun and a rubber balloon or similar article is built up, vulcanized and coated with corn starch, talcum powder or a similar substance without removing the forms from the board.

In operation, the board is placed in a horizontal position longitudinally of the machine with the side thereof carrying the forms 24, presented downwardly. The board 30 is supported on the receiving end of the slideway 4 and the board is moved on said slideway toward the delivery end of the machine. As the form is thus moved on said slideway, the open end of each balloon will be engaged by the brushes 7 and the corn starch or other non-adhesive substance will be removed from said end. As the form board is advanced in the machine, the forward form of one row is forced between the upper ends of the rollers 13 and 14 and into contact with the wool covered surface thereof. The downwardly traveling surface of the rollers 13 and 14 are thus brought into contact with the mouth portion of the rubber article and it is rolled downwardly upon itself. Inasmuch as the forms are traveling in a horizontal plane and the said rollers are inclined to that plane, the roll thus formed on the balloon will be constantly presented to said rolls as the forms are advanced and the article is thus removed from the form. As the rollers 11 and 12 are in a higher plane, the forms in the other roll will be presented in a like manner between the rollers 11 and 12 and the rubber articles may be stripped from all of the forms on said board by passing the board through the machine as above described.

In use, the form board is moved very rapidly through the machine and the balloons or other rubber articles are quickly removed without injury thereto.

Having thus illustrated my invention and described the same in detail, what I claim as new and desire to secure by Letters Patent is:—

1. A machine of the character described including a slideway having bearing rollers journaled therein, a pair of rolling elements arranged below said slideway, said rolling elements mounted in a plane inclined to said slideway with one of said rolling elements on each side of a vertical plane running in parallel spaced relation to the edge of said slideway, a form board adapted to be moved over the slideway and forms depending from said board at each side of the slideway extending between the rolling elements.

2. A machine of the character described including, a slideway, a pair of transversely alined, parallel rollers mounted at an inclination thereto, means to oppositely rotate said rollers, a form board adapted to be moved over the slideway and forms depending from said board and extending between the rollers.

3. A machine of the character described, including a horizontal slideway, a pair of transversely alined, longitudinally directed, spaced parallel rollers mounted beneath each lateral side of said slideway at an inclination thereto, means to rotate said rollers whereby the adjacent surfaces of the rollers in each pair will travel away from said slideway, a form board adapted to be moved over the slideway and forms depending from said board at each side of the slideway extending between the rollers.

4. In a machine of the character described, a horizontal slideway, a pair of transversely alined, longitudinally directed, spaced, parallel rollers mounted beneath each lateral edge of said slideway at an inclination thereto, each roller covered with soft material and each pair of rollers mounted in a separate plane, a form board adapted to be moved over the slideway and forms depending from said board at each side of the slideway extending between the rollers.

5. A machine for removing thin rubber articles from forms, including in combination means to support said form while it is being moved in a straight line, a pair of rollers mounted in parallel relation with the path of movement extending therebetween at an inclination to the axes thereof, means to oppositely rotate said rollers, a form board adapted to be moved over the slideway and forms depending from said board at each side of the slideway extending between the rollers.

6. A machine for removing thin rubber articles from forms arranged on a board in parallel rows including in combination a slideway adapted to support said board with a row of forms depending from each side thereof, a pair of rollers disposed beneath each lateral side of said slideway at an inclination thereto, each pair of rollers arranged to receive therebetween the forms in one of said rows as the same are moved longitudinally of said slideway and means to simultaneously rotate said rollers so that the surfaces thereof contacting with said forms will move downwardly in relation thereto.

7. A machine for removing thin rubber articles from forms arranged on a board in parallel rows including in combination, a slideway adapted to support said board with a row of forms depending from each side thereof, a pair of rollers disposed beneath each lateral side of said slideway at an inclination thereto, with the rollers beneath one side of said slideway in a higher inclined plane than the rollers on the other side thereof, each pair of rollers arranged to receive therebetween and contact with the forms in one of said rows as the same are moved longitudinally of said slideway and means to simultaneously rotate said rollers so that the surfaces thereof contacting with said forms will move downwardly in relation thereto, 8. In a machine for removing thin rubber articles from forms, a horizontal slideway, pairs of rollers journaled beneath each side of the slideway at an inclination with the lower ends thereof at the delivery end of the machine, and a board having parallel rows of spaced forms depending therefrom adapted to be moved over the slideway with the forms depending from each side of the slideway and extending between the rollers of the adjacent pair.

9. In a machine for removing thin rubber articles from forms, a horizontal slideway, pairs of rollers journaled beneath each side of the slideway at an inclination with the lower ends thereof at the delivery end of the machine, a board having parallel rows of spaced forms depending therefrom adapted to be moved over the slideway with the forms depending from each side of the slideway and extending between the rollers of the adjacent pair, said board and forms including centering pins carried by the board, plugs carrying forms mounted on the pins, and a second board associated with the form board and engaging the plugs and adapted to ride upon the slideway.

In testimony whereof I have hereunto set my hand.

JOHN A. KEMPEL